US006909694B1

(12) United States Patent
Phan et al.

(10) Patent No.: US 6,909,694 B1
(45) Date of Patent: Jun. 21, 2005

(54) ROUTING IN A PRIVATE NETWORK WITH COMPRESSION

(75) Inventors: Cao Thanh Phan, Rueil Malmaison (FR); Lahcen Bennai, Colombes (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/364,308

(22) Filed: Jul. 30, 1999

(30) Foreign Application Priority Data

Aug. 6, 1998 (FR) .......................................... 98 10131

(51) Int. Cl.[7] .............................. H04J 1/16; H04J 3/14; H04L 1/00; H04L 12/26
(52) U.S. Cl. ...................................... 370/238; 370/229
(58) Field of Search ................................ 370/238, 521, 370/389, 392, 400, 401, 229, 236; 709/241, 247

(56) References Cited

U.S. PATENT DOCUMENTS

| 5,095,480 | A | * | 3/1992 | Fenner .................... | 370/238 |
|---|---|---|---|---|---|
| 5,258,983 | A | * | 11/1993 | Lane et al. .............. | 370/477 |
| 5,295,183 | A | * | 3/1994 | Langlois et al. ........ | 379/112.04 |
| 5,638,363 | A | * | 6/1997 | Gittins et al. ........... | 370/358 |
| 5,689,641 | A | * | 11/1997 | Ludwig et al. .......... | 709/241 |
| 5,894,588 | A | * | 4/1999 | Kawashima et al. ...... | 710/68 |
| 5,930,348 | A | * | 7/1999 | Regnier et al. .......... | 379/221.01 |
| 6,111,870 | A | * | 8/2000 | Kurtz ..................... | 370/344 |
| 6,122,283 | A | * | 9/2000 | Lee ........................ | 370/408 |
| 6,226,304 | B1 | * | 5/2001 | Ravishankar et al. ..... | 370/527 |
| 6,330,231 | B1 | * | 12/2001 | Bi ........................... | 370/328 |
| 6,359,902 | B1 | * | 3/2002 | Putzolu ................... | 370/466 |
| 6,483,835 | B1 | * | 11/2002 | Tanigawa et al. ........ | 370/395.21 |

FOREIGN PATENT DOCUMENTS

| DE | 196 14 926 A1 | 10/1997 |
|---|---|---|
| GB | 2 283 154 A | 4/1995 |
| WO | WO 98/16083 | 4/1998 |

OTHER PUBLICATIONS

Sameh Rabie: "Traffic Management in Multi–Service Enterprise Networks", ISS 1995. World Telecommunications Congress. (International Switching Symposium), Advance Switching Technologies for Universal Telecommunications at the beginning of the 21st Century, Berlin, Apr. 23–28, 1995, vol. 1, No. SYMP. 15, Apr. 23, 1995, XP0004955590.
Fiedler, C.: "Sprachkommunikation in >>Corporate Network<<" Telcom Report, vol. 18, No. 1, Jan. 1, 1995, p. 20/21 XP000491914.
Torrieri, D.: "Algorithms for finding an Optimal Set of Short Disjoint Paths in a Communication Network" IEEE Transactions on Communications, vol. 40, No. 11, Nov. 1, 1992, pp. 1698–1702, XP000336308.
"Optimal Compression and Routing in Networks" IBM Technical Disclosure Bulletin, vol. 34, No. 3, Aug. 1, 1991, pp. 19–21, XP000210435.
Chia–Jui Wang et al.: "The Use of Artificial Neural Networks for Optimal Message Routing" IEEE Network: The Magazine of Computer Communications, vol. 9, No. 2, Mar. 1, 1995, pp. 16–24, XP000493486.

* cited by examiner

*Primary Examiner*—Ajit Patel
*Assistant Examiner*—Chirag Shah
(74) *Attorney, Agent, or Firm*—Sughrue Mion, PLLC

(57) ABSTRACT

The invention concerns a method of routing between a source node and a destination node in a network having nodes connected by links, compression being used on at least one of said links, the method comprising at least two routing calculation steps for a given number of compressions, i.e. in a plane P($\underline{v}$). A routing calculation step for a given number of compressions uses information obtained during a routing calculation step for a number of compressions less than said given number. In this way a cost function can be minimized whilst assuring that in the route obtained the total number of compressions remains less than a maximum value. The route can be calculated for a given number of compressions using the Dijkstra algorithm and verifying the number of compressions when adding a node to the route. In this case, on reaching a link for which the given number of compressions is exceeded, the distance to the source node is saved for a subsequent calculation step.

16 Claims, 2 Drawing Sheets

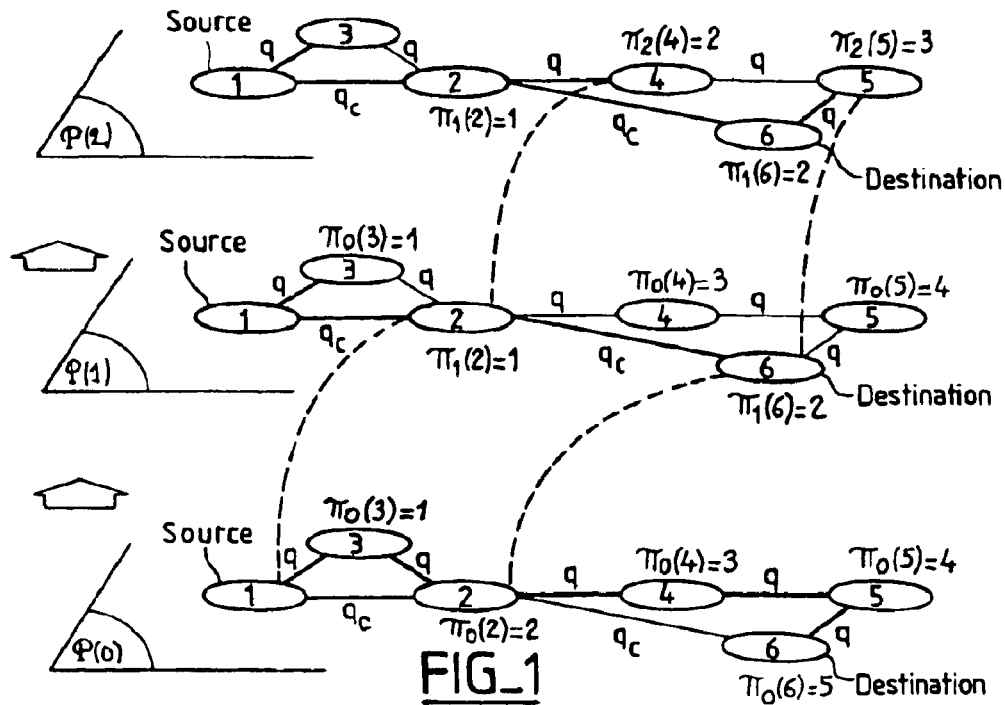
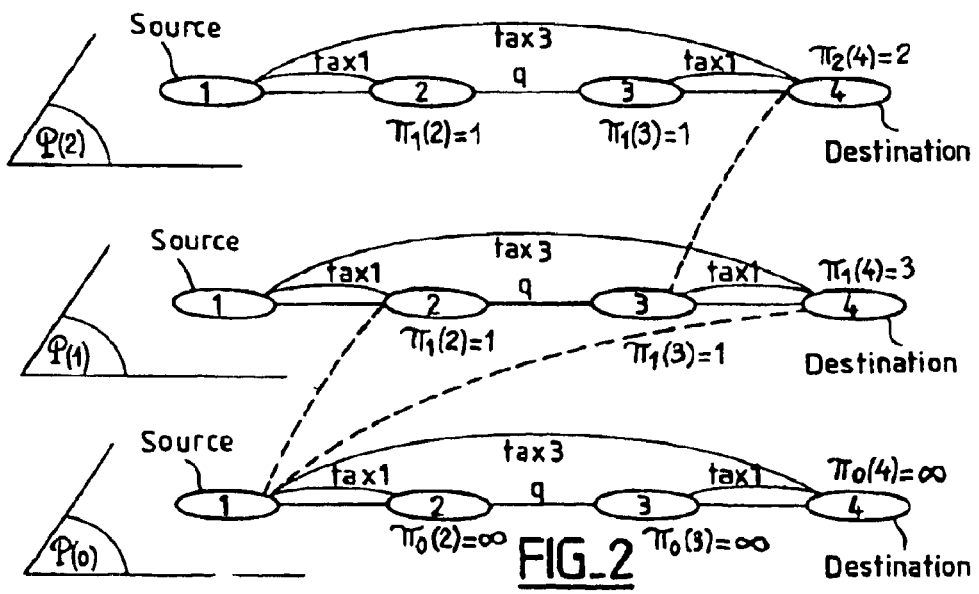

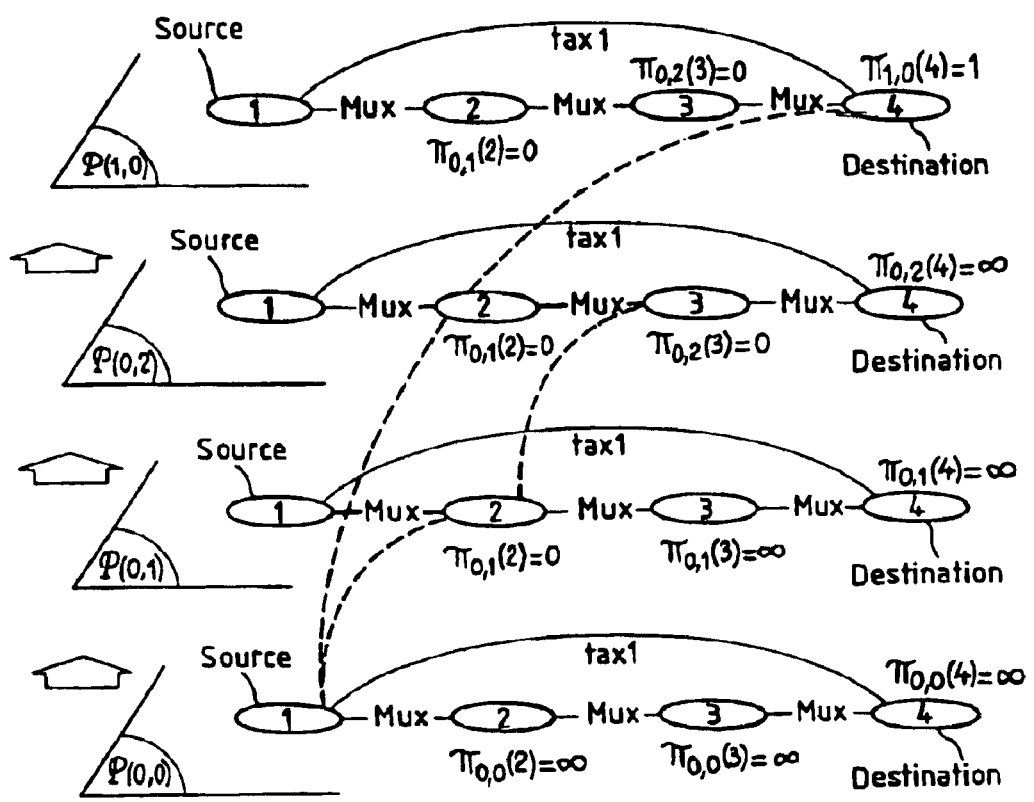
FIG_3

ROUTING IN A PRIVATE NETWORK WITH COMPRESSION

The present invention concerns a method of routing in a private network in which at least some links employ compression.

The invention concerns private telecommunication networks. Such networks are made up of communication nodes interconnected by links carrying calls and/or signaling. It applies equally to private networks made up of dedicated links (physical private networks), virtual private networks and hybrid networks combining these two solutions. In the remainder of the description, the invention is described with reference to one example of a private network with signaling, but it applies more generally to other private networks.

BACKGROUND OF THE INVENTION

In such networks, compressing the signal transmitted on some links is known in itself. This can be the case in particular on links that have only one channel, to enable the routing of a greater number of calls. Compression can have the drawback of causing a loss of quality and, sometimes, of increasing transit time because of the time needed for compression and decompression. A large number of compressions and decompressions can cause echoes and attenuation.

Some prior art routing methods are unaware of the number of compressions and decompressions and accept deterioration of call quality if the number is high. In some instances quality is degraded. Other routing methods use a static routing table, in which the number of compressions and decompressions is limited. This solution has limitations and the private network cannot be exploited to the full using that solution. A final solution is to use the configuration facility to limit the number of transit nodes and therefore the number of compressions and decompressions; that solution is not applicable in all private networks and limits their configurations.

The problem of overflow also occurs in private networks, i.e. the problem of a call request that cannot be satisfied by the network because its resources are congested. This can happen if the private links of the private network are of fixed capacity, rather than of a capacity that is allocated dynamically and which is less than the maximum volume of traffic. Completing the corresponding call by way of the public network or some other external network is known in itself. In other words, if a user at a first node of the private network wishes to call a user at a second node, and if at least one link of the private network is congested so the call cannot be completed, the call is completed directly from the first node to the second node via some external network—typically the public network.

This solution gives rise to the following problems. Firstly, using the public network incurs a cost; secondly, it is not certain that there is a public network access circuit group for all the nodes. Moreover, from the economic point of view, that solution is not very cost effective, and it does not exploit the resources of the private network to the full.

OBJECTS AND SUMMARY OF THE INVENTION

The invention proposes a solution to these problems; it manages overflows out of the private network in a way that minimizes the cost of access to the public network and maximizes the use of resources within the private network.

It applies not only to overflows to the public network, but more generally to overflows to any type of network external to the private network: public switched network, public land or satellite mobile network, another private network, etc.

The Dijkstra algorithm is described in the literature on algorithms and it calculates the shortest path between two nodes in a graph. The algorithm operates as follows: it considers a graph G with N nodes, and which is valued, i.e. each existing path of the graph between two nodes $\underline{i}$ and $\underline{j}$ is given a value or weight $I(i, j)$. It considers an outgoing node $\underline{s}$ of the graph G and an incoming node $\underline{d}$; it seeks a path minimizing $\pi(s, d)$, the distance from $\underline{s}$ to $\underline{d}$, i.e. the sum of the values of the connections connecting $\underline{s}$ to $\underline{d}$. $\overline{S}$ is the subgraph of G made up of the nodes $\underline{x}$ for which the minimum path to $\underline{s}$ is known, and $\overline{S}$ is its complement. $\Gamma_i$ is the set of nodes adjoining a given node $\underline{i}$.

Initially the subgraph $\overline{S}$ contains only the node $\underline{s}$, and $\overline{S}$ contains all the other nodes, with the following initial values given thereto:

$\pi(s, i) = I(s, i)$ for $i \in \Gamma_s$, the parent node being $\pi(s, d) = \infty$, for the other nodes, which have no parent node.

An iteration of the algorithm is effected in the following manner.

If $\overline{S}$ is empty, or if it contains only nodes $\underline{i}$ with $\pi(s, i) = \infty$, the algorithm has finished.

Otherwise, the node $\underline{n}$ of $\overline{S}$ is considered which is nearest the source node, i.e. the node which minimizes $\pi(s, i)$, $i \in \overline{S}$; this node is taken from $\overline{S}$ and placed in S.

The nodes adjacent this node $\underline{n}$ are then considered and the algorithm calculates $\pi(s, n) + l(n, j)$, $j \in \Gamma_n$ and $j \in \overline{S}$;

If this quantity is less than $\pi(s, j)$, then $\pi(s, j)$ is updated:

$\pi(s, j) = l(s, n) + l(n, j)$ and the parent node of $\underline{j}$ is also updated, which becomes $\underline{n}$.

This operation is carried out for all the nodes of $\Gamma_n$, after which $\overline{S}$ is reordered.

In this way, all the nodes of the graph are progressively added to S, in order of increasing path length. To find a path to a given node d, the algorithm can be interrupted before it finishes, once the destination node has been added to the subgraph S.

The validity of the algorithm is demonstrated by the following reduction ad absurdum argument. Consider the node $\underline{n}$ nearest $\overline{S}$ which must be added to S. If there is a nearer path, that path starts from $\underline{s}$ and arrives at $\underline{n}$ and has a first node m in $\overline{S}$. Then:

$\pi(s, m) + \pi(m, n) < \pi(s, n)$ and, since $\pi(m, n)$ is positive or zero:

$\pi(s, m) < p(s, n)$ which contradicts the hypothesis. It is also clear that $\pi(s, m)$ has been calculated in a preceding iteration, when adding the parent of m to S.

The invention proposes a solution to the problem of routing in private networks using compression of signals on some links, which preserves call quality, combined with good exploitation of the capacities of the network. It also satisfies other constraints and manages overflows to other networks, for example.

It is clear that this problem is a serious technical problem and that the claimed method constitutes a technical solution to a technical problem from this point of view, even if it does use an algorithm.

To be more precise, the invention proposes a method of routing between a source node ($\underline{s}$) and a destination node ($\underline{d}$) in a network having nodes interconnected by links, compression being used on at least one of said links, the method comprising at least two routing calculation steps for a given number of compressions, a routing calculation step for a given number of compressions using information obtained during a routing calculation step for a number of compressions less than said given number.

In one embodiment of the invention the method comprises choosing a cost function and the routing calculation minimizes the cost function.

A routing calculation step for a given number of compressions advantageously comprises, at a node ($n$) where the number of compressions from the source node is equal to the given number, seeking and saving for a subsequent calculation step adjacent links on which compression is used.

A routing calculation step for a given number of compressions can use the Dijkstra algorithm and verify the number of compressions when adding a node to the route.

In another embodiment of the invention, the network includes overflow links to an external network and the method comprises at least two routing calculation steps for a given number of overflows- and for a given number of compressions, a routing calculation step for a number of overflows- and a given number of compressions using information obtained during a routing calculation step for a number of overflows less than said given number of overflows.

In this case the method preferably comprises choosing a cost function representative of the cost of overflows and the routing calculation minimizes the cost function. The calculation steps are preferably effected for a given number of overflows by varying the number of compressions and then by varying the number of overflows.

BRIEF DESCRIPTION OF THE DRAWINGS

Other features and advantages of the invention will become apparent on reading the following description of embodiments of the invention given by way of example and with reference to the accompanying drawings, in which:

FIG. 1 is a diagrammatic representation of the implementation of the method of the invention in a private network with six nodes;

FIG. 2 is a diagrammatic representation of the implementation of the invention in another private network;

FIG. 3 is a diagrammatic representation of the implementation of the invention in a further private network.

MORE DETAILED DESCRIPTION

The invention proposes, in a private network, to calculate a route by seeking the shortest path between an source node and a destination node for a given value of the number of compressions and decompressions, and then increasing the value of the number of compressions and decompressions. Furthermore, to limit the number of calculations, the invention proposes to save the results obtained for a given value of the number of compressions and decompressions in order to use them in subsequent calculations.

The invention is described hereinafter in the example of a private network comprising different types of link, namely links with or without the network can also route voice or data calls. The example uses the following rules for routing across the network:

if possible, on passing from one to the other, the aim is to retain the same call "quality"—compressed or not compressed—to reduce the freedom to compress and decompress in subsequent routing the call;

if compression is necessary to pass from one node to its neighbor, then the total number of compressions and decompressions performed to route the call must not exceed the chosen maximum limit; this limit can depend if necessary on the type of call in transit; the limit is advantageously determined to provide a quality of listening on arrival;

if a call arrives at a node in a compressed form, and if the next link allows it, the call is not decompressed; otherwise, the call can be decompressed.

FIG. 1 is a diagrammatic representation of the application of the method of the invention to a private network with six nodes. The network shown in FIG. 1 comprises the six nodes 1 through 6 and the following links:

links without compression between nodes 1 and 3, 3 and 2, 2 and 4, 4 and 5, 5 and 6, marked "g" in the figure;

links with compression between nodes 1 and 2, and 2 and 6, marked "$q_c$" in the figure.

In the example described with reference to FIG. 1, the aim is to find a route between the source node 1 and the destination node 6 with a maximum number NVcompMax of compressions and decompressions equal to 2. Intuitively, the solution is a route via node 2, with only one compression and decompression at node 6; as explained above, there is no decompression at node 2.

To obtain the solution, the invention proposes to apply the Dijkstra shorter path calculation algorithm with modifications to satisfy the constraints on the number of compressions and decompressions. It proposes to apply the algorithm to seek successively shorter paths for given numbers of compressions and decompressions. In the FIG. 1 example, the first step is to look for shorter paths with no compression, as symbolized in FIG. 1 by the plane P(0); the algorithm next seeks shorter paths with compression in the plane P(1) and then shorter paths with two compressions and decompressions in the plane P(2). The distance between the node $\underline{s}$ and the node $\underline{n}$ in a route with at most $\underline{v}$ compressions and decompressions is denoted $\pi_v(s, n)$ hereinafter.

In FIG. 1, the method is applied in the following manner. In the plane P(0), the algorithm considers routes without compression or decompression and calculates:

$\pi_0(1, 3)=1$, $\pi_0(1, 2)=2$, $\pi_0(1, 4)=3$, $\pi_0(1, 5)=4$, $\pi_0(1, 6)=5$, the shorter paths being shown in bold in FIG. 1.

In the plane P(1), it considers routes with compression and calculates:

$\pi_1(1, 2)=1$, using the link between 1 and 2, $\pi_1(1, 6)=2$, using the link between 1 and 2 and then the link between 2 and 6 without decompression at node 2.

In the plane P(2), it considers routes with two compressions or decompressions and calculates:

$\pi_2(1, 4)=2$, using the link between 1 and 2, with one compression and one decompression;

$\pi_2(1, 5)=3$, using the link between 1 and 2 and then the link between 2 and 6 without decompression at node 2 but with decompression at node 6.

The invention advantageously proposes using a step of calculating the shortest path used for a node in the preceding calculation step. Accordingly, still referring to FIG. 1, in the calculation in plane P(1), the algorithm can exploit the fact that:

the link between node 1 and node 2 involves compression, and $\pi_0(1, 2)=2$ and the link between node 2 and node 6 involves compression, these two facts being determined during the shorter path calculation in the plane P(0). In other words, in the plane P(0), at a node n, on reaching a link on which compression is possible, the distance $\pi_0(s, n)$ between the source node and the node n is noted and used in the calculation in the higher plane. This is symbolized, in FIG. 1, by the dashed lines between the planes P(0) and P(1).

In this way, $\pi_1(1, 2)$ and $\pi_1(1, 6)$ can be calculated directly in plane P(1).

Similarly, the dashed lines between planes P(1) and P(2) indicate that the results obtained in the calculations in plane P(1) can be used in plane P(2).

The Dijkstra algorithm or a similar shorter path calculation algorithm can be used for the calculations in each plane. In this case, during an iteration of the Dijkstra algorithm, when testing the adjoining nodes, the algorithm can verify if the maximum number of compressions is complied with. If so, the distance can be updated in a higher plane.

In the FIG. 1 example, in the plane P(2), recalculating the route with one compression from node 1 to node 6 via node 2 is avoided. At node 6 in plane P(1), $\pi_2(1,5)$ is updated by determining that decompression is needed to use the link between 6 and 5. Likewise, at node 2 in plane P(1), $\pi_2(1,4)$ is updated by determining that decompression is needed to use the link between 2 and 4.

In a plane, if no shorter paths are found, or if no forward progress is possible, the given number of compressions is increased to move to a higher plane.

This embodiment of the invention amounts to seeking successive paths involving a given number of compressions and decompressions and updating the distances in the higher planes on each change in the number of compressions or decompressions. The best path—if there is one—is $$\pi^*(s, d) = \underset{v=1}{\overset{NVCompMax}{\text{Min}}} (\pi_v(s, d))$$

The best path is therefore calculated with a number of compressions and decompressions less than the maximum number NVCompMax. The path is determined by moving backwards through the parent nodes from the destination node d and counting the number of compressions and decompressions.

The algorithm seeks the predecessor of d in the plane P(h), i.e. $\phi_h(d)$, where h is the value of v for which the minimum $\pi^*(s,d)$ is reached. For any node j on the route from s to d reached with k compressions and decompressions the predecessor of j is chosen in the plane P(n), $n^2k$ and $\pi_n(s, j)+\pi(j, d) \pi^*(s, d)$ the distance $\pi(j, d)$ being the distance on the optimum route already determined between j and d. In this way the algorithm works back to the node s. The change of plane is then indicative of a change of compression. In this way it is possible to determine when the call must be decompressed or when it must be transitted without being decompressed.

This embodiment concerns a private network in which there is a compressed signal at the exit from a link with compression that can be forwarded retaining its compression. Accordingly, in the calculations in the plane P(v), the values of $\pi_{v+1}(s, i)$ are updated. It is also possible to manage links necessarily generating a compression and a decompression—which can be the case with links using an external multiplexer or a compressor of some other kind. In this case, the values of $\pi_{v+2}(s, i)$ are simply updated on reaching a link using a multiplexer of this kind with an uncompressed signal. The signal must be decompressed before it enters the link on reaching a link using a multiplexer of the above kind with a compressed signal. In this case, the values of $\pi_{v+3}(s, i)$ are updated. The invention therefore enables different types of compression to be managed and adapts to comply with all compatibility rules in the transfer of signals.

What is more, in the FIG. 1 embodiment, the emphasis is on compression and accordingly the links all have a value of 1 for the shorter path calculation. It is also possible, as in the FIG. 2 embodiment, to consider a cost other than a unit cost, for example a cost representative of the use of the resources of the private network, typically a decreasing cost as the number of resources available decreases.

FIG. 2 shows another embodiment of the invention. The FIG. 2 example takes account not only of the problem of compression but also the problem of overflows to an external network. In this case, the invention limits the number of compressions and decompressions and also limits the number of overflows to an external network. This maintains the grade of service and limits call setup time.

FIG. 2 shows an example of a private network with four nodes numbered 1 to 4, signaling links between nodes 1 and 2, 3 and 4, and a link without compression between nodes 2 and 3. Also, overflows are possible through an external network;

between nodes 1 and 2, with a charge of 1;

between nodes 1 and 4, with a charge of 3;

between nodes 3 and 4, with a charge of 1.

This example seeks a route between node 1 and node 4 which has at most two overflows NoverflowMax and which minimizes the sum of the charges. The example does not consider compressions, but the invention also applies when compression is present, as shown by the embodiment described with reference to FIG. 3.

Intuitively, the solution is a route with one overflow between nodes 1 and 2, via the private network between nodes 2 and 3, and with another overflow between nodes 3 and 4.

To obtain this solution, the invention proposes to use the Dijkstra shorter path calculation algorithm with modifications to satisfy the constraints on the number of overflows. It proposes to apply the algorithm to seek successively shorter paths for given number of overflows. In the FIG. 1 example, the first step is to look for shorter paths with no overflow, as symbolized by the plane P(0) in the art of FIG. 1; next the algorithm seeks a shorter path having at most one overflow in the plane P(1), and then a shorter path having two overflows in the plane P(2). Hereinafter, $\pi_v(s, n)$ denotes the total charge incurred between node s and node n, which is infinite if the node cannot be reached.

The FIG. 2 application uses the method in the following manner. In plane P(0), the algorithm considers routes without overflow and the following are calculated:

$\pi_0(1, 2)=\infty$;

$\pi_0(1, 3)=\infty$;

$\pi_0(1, 4)=\infty$;

since it is impossible to reach any node of the network without overflow.

In plane P(1), the routes with compression are considered and the following are calculated:

$\pi_1(1, 2)=1$ with overflow between 1 and 2;
$\pi_1(1, 3)=1$ with overflow between 1 and 2 and then via the link between 2 and 3;
$\pi_1(1, 4)=3$ with overflow between 1 and 4.

In plane P(2), the routes with two overflows are considered and $\pi_2(1, 4)=2$, is calculated, with overflow between 1 and 2 and then between 3 and 4.

As above, the invention proposes to use a step of calculating the shortest path used for a node in the preceding calculation step. Accordingly, referring to FIG. 2, in the calculation in the plane P(1), it is possible to exploit:

the fact that an overflow is possible between node 1 and node 2, and
the fact that an overflow is possible between node 1 and node 4, these two facts being determined during the shorter path calculation in the plane P(0) when examining the nodes neighboring node 1, indicating that nodes 2 and 4 can be reached only with an overflow. More generally, in the plane P(0), on reaching a node n with one possible overflow, the information is saved for the calculation in the higher plane. This is symbolized in FIG. 1 by the dashed lines between the planes P(0) and P(1). $\pi_1(1, 2)$ and $\pi_1(1, 4)$ can therefore be calculated directly in plane P(1).

Similarly, the dashed line between planes P(1) and P(2) indicates that the result obtained from the calculations in plane P(1) can be used in plane P(2), i.e. on reaching node 3, node 4 cannot be reached because of the constraint on the number of overflows, but this node can be reached with two overflows.

The method described with reference to FIG. 1 can be used for the calculations, mutatis mutandis. The method described below with reference to FIG. 3, and in the appendix, can also be used with advantage; the algorithm from the appendix can be simplified to take account only of overflows or only of compressions.

The invention is described with reference to FIG. 2 in the situation of a cost calculated as the sum of the charge incurred for each overflow. Another form of calculating the cost of the overflow can be considered, for example the cost described in the patent application filed by the applicant under the title "Routing of calls with overflow in a private network". This cost takes account not only of charges incurred because of overflows but also of occupancy of resources in the network; of two routes, the preferred one is the one with the lower sum of charges and, if the charges are the same, the route which makes best use of the resources of the network.

FIG. 3 shows a further embodiment of the invention in another private network. The FIG. 3 example considers both a limitation on the number of compressions and decompressions and a limitation on the number of overflows.

The FIG. 3 network comprises four nodes numbered 1 to 4 and links with a multiplexer between nodes 1 and 2, 2 and 3, 3 and 4. As explained above, a link with multiplexing entails compression and decompression. To simplify the description of the figure, and because it is not possible to have only one compression, the compressions and the decompressions are not counted, but rather the number of passes in a link with a multiplexer; this amounts to counting the compressions and decompressions 2 by 2; accordingly, plane P(0, 1) corresponds not to a compression but to a link with a multiplexer, i.e. in fact a compression and a decompression.

An overflow is possible between nodes 1 and 4, with a charge of 1. The example seeks a route between the source node 1 and the destination node 4 with a maximum number NvcompMax of passes in a multiplexed link equal to 2 and a maximum number NoverflowMax of overflows equal to 2. A route is sought which minimizes the cost $\pi_{b, v}(s, -i)$ of the overflows, i.e. the total charge incurred because is of the overflows. Intuitively, the solution is a route with direct overflow between nodes 1 and 4.

Overflow$_{h, v}$(s, n) is the minimum number of overflows between s and n.

To obtain the solution, the invention proposes to apply the Dijkstra algorithm to seek successively shorter paths for given numbers v of passes in a multiplexed link, on the one hand, and h of overflows, on the other hand. The FIG. 1 example begins by seeking shorter paths with no compression (v=0) and no overflow (h=0), as shown symbolically in the lower part of FIG. 1 by the plane P(h=0, v=0); the algorithm then seeks shorter paths having a compression and no overflow in plane P(0, 1), followed by shorter paths having two compressions and decompressions and no overflow in plane P(0, 2). Finally, paths with one overflow and no compression are sought in plane P(1, 0), which provides a solution. As in FIG. 2, $\pi_{h, v}(s, n)$ is the pair formed of the number of overflows and the total charge incurred between node s and node n in a route with v compressions and decompressions and h overflows.

In plane P(0, 0), routes with no compression or overflow are considered and the algorithm determines that there is no route without compression or overflow. By testing the neighbors of node 1, it is found that node 2 can be reached with one compression and node 4 can be reached with one overflow. This leads to updating of the distances in the planes P(0, 1) and P(1, 0), as shown in dashed line in the figure.

In plane P(0, 1), routes with one compression and without overflow are considered and the algorithm determines that $\pi_{0, 1}(1, 2)$ has the value 0 and that other nodes cannot be reached. On examining the neighbors of node 2, it finds that node 3 can be reached with two compressions and the corresponding distance is updated in the plane P(0, 2), as shown by the dashed line between planes P(0, 1) and P(0, 2).

In plane P(0, 2), it considers routes with two compressions and no overflow and finds that $\pi_{0, 2}(1, 3)$ has the value 0 and that node 4 cannot be reached.

In plane P(1, 0), it determines that node 4 can be reached with one overflow and that $\pi_{1, 0}(1, 4)$ has the value 1.

This example seeks to minimize the number of overflows and the algorithm therefore stops as soon as the destination node has been reached in a plane. If the destination node is reached for a given number $h_0$ of overflows, the algorithm can continue with the calculations for the various values of v and consider the path which has a minimum distance for all possible values of v with $h^2h_0$.

The appendix at the end of this description shows one method of carrying out the calculations for a network of the type shown in FIG. 3. In this embodiment of the invention, the Dijkstra algorithm again handles the shorter path calculations in each plane.

In the example set out in the appendix, the value of the number of overflow is scanned from 0 to NOverflowMax and, for each value, the values of the number v of compressions and decompressions are scanned from 0 to NVCompmax. The calculation is then done in each plane P(h, v) in succession.

In each plane, the calculation begins with an initialization. If h and v are zero, in other words in the P(0, 0) plane, initialization is as follows: for all nodes other than the source node, the value of $\pi_{h, v}(s, n)$ is initialized to infinity; for any node of the network, $\phi_{h,v}(n)$ has a NULL value in the plane P(h, v), i.e. no node has a predecessor in the tree of shorter paths. For h=0 and v=0, for nodes neighboring s, $\pi_{0,0}(s, n)$ is initialized to the corresponding value of the function ReadCost; this function estimates the cost of passage between two neighboring nodes on the link connecting them or on an overflow link connecting them.

All nodes n other than the source node are then put in $\overline{S}$, with a distance $\pi_{0,0}(s, n)$. The function VerifConsistency(l(s, n), h=0, v=0, s, n) then carries out a consistency check. This function checks the compatibility of the qualities of the current plane and prepares the cost for the next plane. In plane P(0, 0), it verifies the consistency between s and n, in other words it verifies that routing between s and n is possible.

For values of h and v that are not both zero, i.e. in planes other than P(0, 0), initialization is as follows: the set $\overline{S}$ is emptied and points are put in it for which the number of overflows is greater than or equal to the current value of h. This corresponds to the following approach:

- if a node n has already been reached in a number of overflows less than h, i.e. if there is a path between the source node s and the node a with at least h overflows, the node cannot be brought closer to the source node by passing through a node with a number of overflows greater than or equal to h. It is therefore not necessary to put node n into $\overline{S}$. This corresponds to a choice of optimization in this embodiment of the invention, for which the number of overflows is minimized, even at the cost of an additional compression;
- if node a has already been reached in a number of overflows equal to h, i.e. if there is a path between the source node s and node n with h overflows, node n can serve as a transit node to reach other nodes with h overflows; it can also move towards the root, subject to an additional compression or decompression; node n is then put in $\overline{S}$;
- if node n has already been reached in a number of overflows greater than h, i.e. if there is a path between the source node s and node a with more than h overflows, or if there is no path between s and n, node n can be brought close to the source node; it is then put in $\overline{S}$.

Accordingly, after initialization in the plane P(h, v), all the nodes not yet reached or reached by routes with h or more overflows are in $\overline{S}$ After initialization, paths are calculated in the plane P(h, v). A calculation is performed in each plane using the Dijkstra algorithm, updating the values of $\pi_{h,v}$ in the higher planes, if no further progress is possible that conforms to the constraints on h and v.

Node n of $\overline{S}$ which minimizes the charge $\pi_{h,v}(s, i)$ is therefore considered. Thereafter the process is as in the Dijkstra algorithm; however, when the neighbors of n are considered, a verification is performed to determine if compression is necessary to move towards point n, or if decompression is necessary, as in the FIG. 1 example. The distance values in plane P(h, v+1) are updated in a corresponding manner.

Furthermore, when a point in the vicinity cannot be reached except with an overflow, the corresponding distance value is updated in plane P(h+1). In this plane, a verification is performed as previously to determine if compression or decompression is necessary; the compression and decompression constraints can also apply to an overflow link.

In one embodiment, if there is a link without compression supporting the overflow, the overflow is authorized only if the link is congested; this amounts to optimizing the resources of the private network before authorizing the overflow; a similar result could be obtained with a distance $\pi$ taking account of the use of the resources of the network, as explained in the Applicants' aforementioned patent application.

After processing the various planes, at least until a route reaching the destination node is found, the route is found as explained with reference to FIG. 1.

In the FIG. 3 example, limiting overflow charges is given preference over the number of compressions and decompressions. This is reflected in the path through the calculation planes—starting by saturating the constraint on the number of compressions and decompressions before envisaging an overflow. Of course, the invention also functions in the contrary case, or more generally with any form of scanning the various possible planes. Using the notation h and v employed above, the invention scans the pairs (h, v), with h≦NVCompmax and v≦NOverflowMax. The process can be as described, scanning the values of v with constant h and then with increasing h; the values of h could also be scanned at constant v, after which v is increased. The calculations could also be done at constant h+v, or any other solution could be used. In particular, applying the algorithm in the appendix with v=0 provides a solution for the FIG. 1 calculation.

The invention is not limited to the embodiments described; it applies more generally in any private network for calculating routes minimizing one or more charges and satisfying one or more constraints on a maximum value; in the FIG. 1 example, the distance is minimized in terms of the number of links and the constraint is a constraint on the number of compressions and decompressions. In the FIG. 2 example, an overflow cost is minimized and the constraint is a constraint on the number of overflows. In the FIG. 3 example, the aim is to minimize the overflow charges and to conform to constraints on the number of compressions and decompressions and the number of overflows. Thus the invention can be applied to separate constraints and to varied cost functions.

It would also be possible to eliminate the step of determining the minimum number of compressions or decompressions; the only consequence of this would be a longer calculation, where necessary, or unnecessary scanning of unsatisfactory solutions.

In the preferred embodiments, the number of compressions and decompressions is counted. It is clear that only the number of compressions could be counted, or only the number of decompressions, likewise to limit the total number of compressions and decompressions. This is based on the-generally applicable rule that a decompression necessarily follows an earlier compression. Note that this rule is not always valid if there is more than one type of compression.

The invention applies also to network types different from those described in the preferred embodiments.

Finally, the description and the claims mention the Dijkstra algorithm. It is to be understood that this term covers not only the version of the shorter path algorithm proposed by Dijkstra, but also similar versions, and in particular the Bellman algorithm or the Floyd algorithm. Note that the Bellman algorithm applies only for graphs without circuits.

APPENDIX

```
For h = 0 to NOverflowMax do
For v = 0 to NVcompmax do
If v = 0 and h = 0
Then
        ∀ (h, v, n), π_{h,v}(s, n) = ∞ and φ_{h,v}(n) NULL
        ∀ n ∈ Γ s, π_{0,0}(s, n) = ReadCost(1(s,n), h=0, v=0)
                PutInHeap(π_{0,0}(s, n), S̄)
                VerifConsistency(1(s, n), h=0, v=0, s, n)
If not
        S̄ = ∅
        ∀ n If Overflow(s, n) ³h
        Then
                If v = 0 PutInHeap(π_{h,0}(s, n), S̄)
                If not PutInHeap(Min[π_{h,v}(s, n),π_{h,v-1}(s, n)], S̄)
                End if
        End if
End if
While S̄ ≠ ∅ or Min S̄ < ∞, do
        Consider n such that π_{h,v}(s, n) = Min{π_{h,v}(s, i), i ∈ S̄}
        Put (n, π_{h,v}(s, n)) in S and remove n from S̄
        For p ∈ Γ_n and p ∈ S̄
                c = ReadCost(1(n, p), h, v)
                If π_{h,v}(s, p) > π_{h,v}(s, n) + c Then
                        π_{h,v}(s, p) := π_{h,v}(s, n) + c
                        φ_{h,v}(p) := n
                End if
                UpdateHeap(π_{h,v}(s, p), S̄)
                If CompressionIsNecessary
                Then
                        π_{h,v+1}(s, p) := Min(π_{h,v+1}(s, p); π_{h,v}(s, n) + c)
                        If new π_{h,v+1}(s, p)
                        Then
                                φ_{h,v+1}(p) = n
                        End if
                End if
                If DecompressionIsNecessary
                        π_{h,v+1}(s, p) := Min(π_{h,v+1}(s, p); π_{h,v}(s, n) + c)
                        If new π_{h,v+1}(s, p)
                        Then
                                φ_{h,v+1}(p) = n
                        End if
                End if
                If TheLinkCannotBeUsed
                        c = ReadCost(overflowlink(n, p), h, v)
                        If π_{h+1,v}(s, p) > π_{h+1,v}(s, n) + c Then
                                π_{h+1,v}(s, p) := π_{h+1,v}(s, n) + c
                                φ_{h+1,v}(p) := n
                        End if UpdateHeap(π_{h+1,v}(s, p), S̄)
                If CompressionIsNecessary
                Then
                        π_{h+1,v+1}(s, p) := Min(π_{h+1,v+1}(s, p); π_{h,v}(s, n)+c)
                        If new π_{h+1,v+1}(s, p)
                        Then
                                φ_{h+1,v+1}(p) = n
                        End if
                End if
                If DecompressionIsNecessary
                        π_{h+1,v+1}(s, p) := Min(π_{h+1,v+1}(s, p); π_{h,v}(s, n) + c)
                        If new π_{h+1,v+1}(s, p)
                        Then
                                φ_{h+1,v+1}(p) = n
                        End if
                End if
            End if
    EndFor
EndWhile
EndFor
EndFor
```

What is claimed is:

1. A method of routing between a source node and a destination node in a network having nodes connected by links, wherein at least one link uses signal compression and the remaining links do not use signal compression, wherein the method comprises:

performing at least two routing calculations for a maximum number of signal compressions and decompressions said routing calculations comprising a first routing calculation for a number of signal compressions and decompressions that is less than said maximum number, and a second routing calculation for said maximum number of signal compressions and decompressions using information obtained from the first routing calculation, and selecting a route between said source node and said destination node based on the least number of links required for the route as determined by said routing calculations.

2. The method according to claim 1, wherein the method further comprises choosing a cost function and wherein the routing calculations minimize the cost function.

3. The method according to claim 1, wherein a routing calculation comprises, at a node where the number of signal compressions and decompressions from the source node is equal to the maximum number, seeking and saving adjacent links on which signal compression is used for a subsequent routing calculation.

4. The method according to claim 1, wherein a routing calculation for a given number of signal compressions and decompressions uses the Dijkstra algorithm and verifies the number of links using signal compression when adding a node to the route.

5. A method of routing between a source node and a destination node in a network having nodes connected by links, wherein at least one link uses signal compression and the remaining links do not use signal compression and the network further comprises overflow links to an external network, wherein the method comprises:

performing at least two routing calculations for a maximum number of compressions and decompressions, said routing calculations comprising a first routing calculation for a number of signal compressions and decompressions that is less than said maximum number, and a second routing calculation for said maximum number of signal compressions and decompressions using information obtained from the first routing calculation, performing at least two overflow routing calculations for a maximum number of overflow links and for the maximum number of signal compressions and decompressions, said overflow routing calculations comprising a first overflow routing calculation for a number of overflows less than said maximum number of overflow links, and a second overflow routing calculation for the maximum number of overflow links and the maximum number of signal compressions and decompressions using information obtained from said first overflow routing calculation, and selecting a route between said source node and said destination node based on the least number of links required for the route as determined by said routing calculations.

6. The method according to claim 5, wherein the method further comprises choosing a cost function representative of the cost of the overflow links and wherein the routing calculations minimize the cost function.

7. The method according to claim 5, wherein the routing calculations are effected for a given number of overflow links by varying the number of links using signal compression and then by varying the number of overflow links.

8. The method according to claim 6, wherein the cost function accounts for occupancy of resources in the network.

9. The method according to claim 8, wherein the cost function accounts for charges incurred because of the overflow links.

10. A method of routing between a source node and a destination node in a network having nodes connected by links, wherein at least one link uses signal compression and the remaining links do not use signal compression, wherein the method comprises:

performing a first routing calculation with links that do not use signal compression;

performing a second routing calculation for a number of signal compressions and decompressions that is less than a maximum number of signal compressions and decompressions;

performing a third routing calculation for the maximum number of signal compressions and decompressions using information obtained from the first and second routing calculations; and selecting a route between said source node and said destination node based on the least number of links required for the route as determined by said routing calculations.

11. The method according to claim 10, wherein the method further comprises choosing a cost function and wherein the routing calculations minimize the cost function.

12. The method according to claim 10, wherein a routing calculation for a given number of signal compressions and decompressions comprises at a node where the number of signal compressions and decompressions from the source node is equal to the maximum number, seeking and saving adjacent links on which signal compression is used for a subsequent routing calculation.

13. The method according to claim 10, wherein a routing calculation for a given number of signal compressions and decompressions uses the Dijkstra algorithm and verifies the number of links using signal compression when adding a node to the route.

14. A method of routing between a source node and a destination node in a network having nodes connected by links, wherein at least one link uses signal compression and the remaining links do not use signal compression and the network further comprises overflow links to an external network, wherein the method comprises:

performing a first routing calculation with links that do not use signal compression;

performing a second routing calculation for a number of compressions and decompressions that is less than a maximum number of signal compressions and decompressions;

performing a third routing calculation for the maximum number of links using signal compressions and decompressions using information obtained from the first and second routing calculation;

a fourth routing calculation for a number of overflow (inks less than a maximum number of overflow links;

a fifth routing calculation for the maximum number of overflow links and the maximum number of signal compressions and decompressions using information obtained from said fourth routing calculation; and selecting a route between said source node and said destination node based on the least number of links required for the route as determined by said routing calculations.

15. The method according to claim 14, wherein the method further comprises choosing a cost function representative of the cost of the overflow links and wherein the routing calculations minimize the cost function.

16. The method according to claim 14, wherein the routing calculations are effected for a given number of overflow links by varying the number of links using signal compression and then by varying the number of overflow links.

* * * * *